March 12, 1968     K. SENNEWALD ET AL     3,372,986
PROCESS FOR PRODUCING HYDROCYANIC ACID AND ACRYLONITRILE
FROM ACROLEIN-CYANOHYDRIN
Filed Aug. 29, 1963
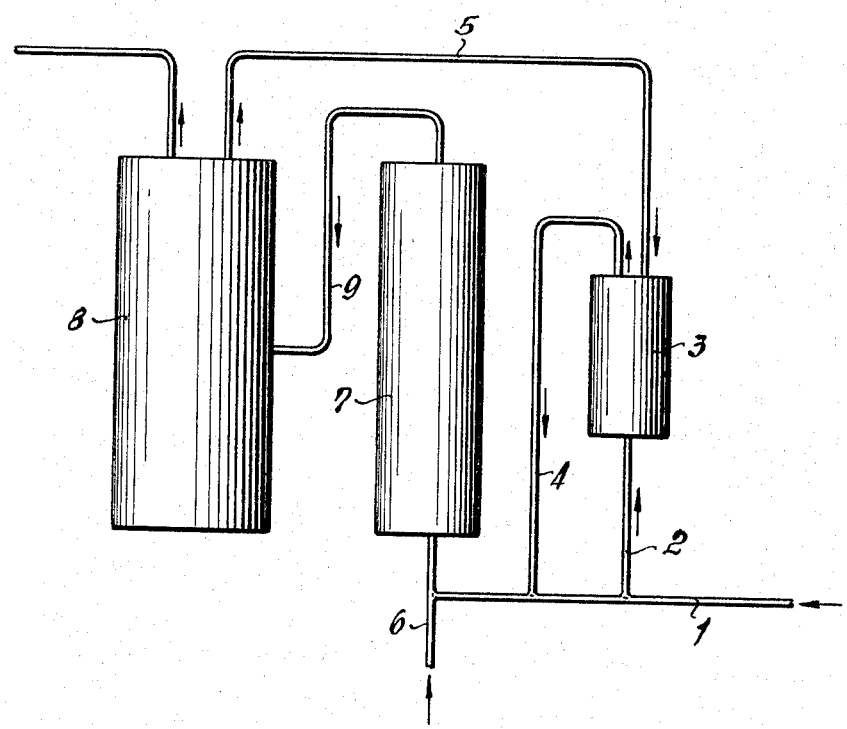
INVENTORS
KURT SENNEWALD,
WILHELM VOGT,
KLAUS GEHRMANN &
ALEXANDER OHORODNIK
BY Connolly and Hutz
ATTORNEYS États-Unis Patent Office 3,372,986
Patented Mar. 12, 1968

3,372,986
PROCESS FOR PRODUCING HYDROCYANIC ACID AND ACRYLONITRILE FROM ACROLEIN-CYANOHYDRIN
Kurt Sennewald, Wilhelm Vogt, and Klaus Gehrmann, Knapsack, near Cologne, and Alexander Ohorodnik, Berrenrath, near Cologne, Germany, assignors to Knapsack-Griesheim Aktiengesellschaft, Knapsack, near Cologne, Germany, a corporation of Germany
Filed Aug. 29, 1963, Ser. No. 305,366
Claims priority, application Germany, Sept. 15, 1962, K 47,740
6 Claims. (Cl. 23—151)

The present invention relates to a process for using acrolein-cyanohydrin, especially of the acrolein-cyanohydrin obtained as a by-product in the manufacture of acrylonitrile.

The preparation of acrylonitrile by catalytical transformation of an olefin, preferably propylene, with ammonia and oxygen in the gaseous phase at relatively high temperatures gives rise to the formation of varying amounts of acrolein as a by-product. During the work up of the reaction products, the acrolein is entrained into the crude acrylonitrile to imperatively react with the permanently present excess of hydrocyanic acid with the resultant formation of acrolein-cyanohydrin. On purifying the acrylonitrile, the acrolein-cyanohydrin is obtained in the sump portion of the distillation means, and as a useless and poisonous product was previously required to be destroyed.

The present invention unexpectedly provides a simple process for producing acrylonitrile and hydrocyanic acid by reacting acrolein-cyanohydrin with ammonia and oxygen or air in the following manner:

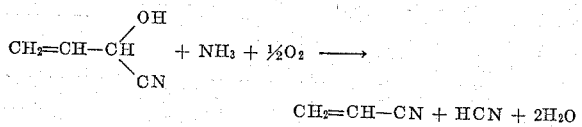

$$CH_2=CH-CN + HCN + 2H_2O$$

the reaction being carried out at temperatures of 300 to 550° C. with the use of catalysts the same as ordinarily used under analogous conditions for making acrylonitrile from olefins, ammonia, air and optionally steam.

The conventional methods used for making acrylonitrile from olefins propose to use the following metals or metal oxides, alone or in combination, as the catalyst: thorium, molybdenum, vanadium, tin, chromium, tungsten, cobalt, iron, manganese, nickel, copper, bismuth, titanium, zinc, cadmium, silver, gold, lead, niobium, tantalum, uranium, and cerium. These catalysts are generally applied to a carrier, such as aluminum oxide, aluminum phosphate or boron phosphate, silica gel or pumice. The addition of phosphoric acid may also be advantageous. The reaction temperatures vary between about 300 to 550° C., the pressures between about 0.1 to 10 atmospheres absolute, and the mixture of olefin-air-ammonia is allowed to stay over the catalyst for a period of time of about 0.05 to 50 seconds, preferably about 0.2 to 20 seconds. The ratio by volume or molar ratio of the reaction partners may vary within wide limits, and about 1 to 10 mols ammonia, 1 to 40 mols oxygen, preferably in the form of air, and about 0 to 5 mols steam may be used per mol olefin, the reaction being carried out with the use of a solid bed catalyst, or, when the catalyst is moved, with a fluidized or flowing bed catalyst.

On the one hand, the process of the present invention thus enables the acrolein-cyanohydrin to be separated from acrylonitrile during the work up and to be transformed, preferably while being diluted with steam, substantially into acrylonitrile and hydrocyanic acid, the transformation being carried out at 300 to 550° C. in the presence of oxygen and ammonia in a separate reactor containing the aforesaid catalyst components in appropriate admixture, and under the above-mentioned customary reaction conditions with respect to pressure, time of stay, gas composition, etc. On the other hand, it is especially advantageous from an economical point of view to continuously separate from the other reaction components the acrolein-cyanohydrin permanently obtained as a by-product in the manufacture of acrylonitrile from an olefin, to continuously return the acrolein-cyanohydrin so separated into the same reactor in which the acrylonitrile is being prepared, and to transform it therein under identical conditions into additional acrylonitrile and hydrocyanic acid. The olefin present in the reactor does not at all impair such transformation. Also in this variant of the process of the present invention, it is advantageous to dilute the recycled acrolein-cyanohydrin with water, approximately in a ratio by weight of 1:2 to 1:10, the proportion of water to be used being determined by the gases supplied to the reactor containing steam or not.

In order to prevent the acrolein-cyanohydrin from undergoing polymerization, the ammonia necessary for carrying out the reaction should not be brought into contact with liquid acrolein-cyanohydrin. To this effect, the acrolein-cyanohydrin/water mixture may be atomized with evaporation into the gas stream consisting of olefin, ammonia, air and optionally steam; alternatively, a certain proportion of the ammonia-free gas stream may be first saturated at a certain temperature with acrolein-cyanohydrin in vapor form and this partial stream then again combined with the main stream. This mixture in which the acrolein-cyanohydrin does no longer appear in liquid form, may then be combined with the stream of ammonia supplied separately and introduced into the reactor.

In the reactor, the acrolein-cyanohydrin is transformed with oxygen and ammonia substantially into hydrocyanic acid and acrylonitrile. Acetonitrile, carbon monoxide and carbon dioxide are obtained as by-products.

An apparatus suitable for use in carrying out the continuous transformation of acrolein-cyanohydrin by the process of the present invention into acrylonitrile and hydrocyanic acid, the transformation being effected so as to form a part of the conventional manufacture of acrylonitrile from olefins, ammonia and air, is now described with reference to the accompanying drawing.

A portion of the gases, i.e. olefin, preferably propylene, oxygen, preferably in the form of air, and optionally steam, to be supplied to the reactor through main line 1 is caused to flow through line 2 into saturator 3, saturated therein at a certain temperature, for example at 460° C., with a mixture of acrolein-cyanohydrin and water coming through line 5 from the crude acrylonitrile preparation unit 8, and the resulting gas/vapor mixture is returned through line 4 into main line 1. Ammonia is supplied in measured quantities through line 6 and the whole gas mixture is introduced into reactor 7. The off-gas escaping from the reactor through line 9 is processed in customary manner; acrylonitrile, hydrocyanic acid and acetonitrile can be removed, for example, by being washed with water and ultimately separated from one another by distillation.

The transformation of acrolein-cyanohydrin into acrylonitrile and hydrocyanic acid by the process of the present invention results in the acrylonitrile yield being improved by some percent without special technical expenditure being required.

Furthermore, the continuous transformation of acrolein-cyanohydrin into acrylonitrile and hydrocyanic acid subsequent to the actual acrylonitrile manufacture may result in the proportion of ammonia consumed for acrylonitrile formation being reduced. In most cases, ammonia has previously been used in a molar excess in order to increase the propylene conversion rate or to suppress the formation of acrolein. In the preparation of acrylonitrile, the ammonia in excess is, however, not easy to recover and thus adds to the production costs. In contrast therewith, the process of the present invention enables the acrolein or more accurately its cyanohydrin, which is obtained in increased proportions without a large excess of ammonia being used for acrylonitrile preparation, to be transformed into acrylonitrile and hydrocyanic acid which has previously been impossible. Seen under these novel aspects as offered by the present invention, it is certainly economic to reduce the excess of ammonia which previously had to be used for the manufacture of acrylonitrile.

The process of the present invention is more particularly concerned with a process for transforming acrolein-cyanohydrin, wherein the acrolein-cyanohydrin is transformed into acrylonitrile and hydrocyanic acid, the transformation being carried out in the presence of ammonia, oxygen, which is preferably in the form of air, and optionally steam on a catalyst having a composition identical with or similar to that of the catalyst customarily used for the preparation of acrylonitrile from olefins, ammonia and air.

The process of the present invention can be carried out using as the starting material the acrolein-cyanohydrin obtained as a by-product in the manufacture of acrylonitrile from olefins, for example propylene, ammonia, air and optionally steam on a catalyst, the acrolein-cyanohydrin used as the starting material having previously been separated in conventional manner from its accompanying substances, especially acrylonitrile and hydrocyanic acid. It is especially economic to continuously recycle the separated acrolein-cyanohydrin, preferably while being diluted with water, into the acrylonitrile manufacturing process and in this manner to transform it on the catalyst into acrylonitrile and hydrocyanic acid at temperatures of about 300 to 550° C. in the presence of the olefin, which is preferably propylene, air, ammonia and optionally steam.

The acrolein-cyanohydrin should preferably be introduced in the gaseous state into the reactor.

The catalyst (contact) contains the following metals or their oxides, alone or in combination: barium, rhenium, rhodium, palladium, antimony, aluminum, thorium, molybdenum, vanadium, tin, chromium, tungsten, cobalt, iron, manganese, nickel, copper, bismuth, titanium, zinc, cadmium, silver, gold, lead, niobium, tantalum, uranium, cerium and optionally phosphorus.

The catalyst may also contain a carrier, for example, silica gel ($SiO_2$), aluminum oxide, aluminum phosphate, boron phosphate, pumice or the like.

It is generally advantageous to use a starting gas mixture containing 0.1 to 10% by volume, preferably 0.5 to 5% by volume, acrolein-cyanohydrin.

The following examples illustrate the invention without limiting it thereto:

Example 1

A catalyst suitable for use in carrying out the process of the present invention was prepared as follows:

730 cc. of a ferrinitrate solution containing altogether 365 grams $Fe(NO_3)_3 \cdot 9H_2O$ were combined with 438 cc. of a bismuth nitrate solution in nitric acid, the solution containing altogether 438 grams $Bi(NO_3)_3 \cdot 5H_2O$, and with 416 cc. of an ammonium molybdate solution containing altogether 208 grams $(NH_4)_6Mo_7O_{24} \cdot 4H_2O$. 10 cc. 85% phosphoric acid were added and the whole was introduced into 4900 grams 14% aqueous, colloidal silicic acid. The mixture was evaporated to dryness. The residue obtained was heated for 24 hours at 150° C. and for 16 hours at 500° C. After cooling, the catalyst so obtained was comminuted to a grain size of 0.2 to 0.3 mm. and screened.

Example 2

A fluidized bed reactor 150 cm. long and 5 cm. wide was charged with 500 cc. of a catalyst prepared in the manner set forth in Example 1 and 42 grams acrolein-cyanohydrin (0.5 mol) dissolved in about 100 cc. water, about 2 mols oxygen in the form of air and ½ mol ammonia were introduced, per hour, into the reactor at a reaction temperature of 450 to 500° C.

The resulting reaction product was composed as follows:

| | Percent |
|---|---|
| Acrolein | 0.01 |
| Acetonitrile | 2.0 |
| Propionitrile | 0.7 |
| Acrylonitrile | 58.5 |
| Hydrocyanic acid | 34.3 |
| Acrolein-cyanohydrin | 4.5 |

Calculated on the acrolein-cyanohydrin conversion rate of 95.5%, the yield of useful acrylonitrile and hydrocyanic acid amounted to 70 to 80%, while the remaining acrolein-cyanohydrin underwent combustion into carbon oxides or transformation into other useless by-products.

Example 3

A solid bed reactor charged with 900 cc. of a catalyst prepared in the manner set forth in Example 1 was supplied, at a reaction temperature of 460° C. and for a time of stay of 2.2 seconds, with the following amounts of starting material (a) without recycling the acrolein-cyanohydrin and (b) while recycling the acrolein-cyanohydrin:

| | Mols/hr. | |
|---|---|---|
| | (a) | (b) |
| Propylene | 2.6 | 2.6 |
| Ammonia | 2.7 | 2.7 |
| Acrolein-cyanohydrin | | 0.16 |
| Air (0.21 mol percent $O_2$+0.79 mol percent $N_2$) (5.46 $O_2$ + 20.54 $N_2$) | 26.0 | 26.0 |
| Steam | 13.0 | 13.0 |

The following result was obtained:

| | (a) Without Recycling | (b) While Acrolein-cyanohydrin |
|---|---|---|
| Acrylonitrile, mol/hr | 1.67 | 1.78 |
| Acrolein, mol/hr | 0.11 | 0.12 |
| Acetonitrile, mol/hr | 0.4 | 0.4 |
| Hydrocyanic acid, mol/hr | 0.75 | 0.86 |

The improved yield obtained, referred to the propylene introduced, will become apparent on comparing the following numerical figures listed under (a) and (b):

| | (a) Percent | (b) Percent |
|---|---|---|
| Transformed into acrylonitrile | 64.2 | 68.5 |
| Transformed into acrolein | 4.2 | 4.6 |
| Transformed into acetonitrile | 1.0 | 1.0 |
| Transformed into hydrocyanic acid | 9.6 | 11.0 |

In this case, approximately 70% of the acrolein-cyanohydrin introduced were transformed into acrylonitrile and hydrocyanic acid.

We claim:

1. A process for producing acrylonitrile and hydrocyanic acid comprising contacting acrolein-cyanohydrin reactant with reactive amounts of ammonia and at least one substance selected from oxygen and air and effecting the reaction at a temperature of about 300–550° C. in the presence of a catalyst consisting substantially of at least one oxide of an element selected from the group consisting of barium, rhenium, rhodium, palladium, antimony, aluminum, thorium, molybdenum, vanadium, tin, chromium, tungsten, cobalt, iron, manganese, nickel, copper, bismuth, titanium, zinc, cadmium, silver, gold, lead, niobium, tantalum, uranium, cerium and phosphorus.

2. The process of claim 1 wherein the acrolein-cyanohydrin reactant is initially obtained as a by-product in a catalyzed process for producing acrylonitrile from an olefin, ammonia and air, and utilizing an identical catalyst system, said reactant being substantially separated from accompanying by-products and continuously recycled into said catalyzed process in the presence of an olefin, air and ammonia.

3. The process of claim 1, wherein the reaction is carried out in the presence of steam.

4. The process of claim 2, wherein the olefin is propylene.

5. The process of claim 1, wherein the catalyst is supported on a carrier material selected from the group consisting of silica gel ($SiO_2$), aluminum oxide, aluminum phosphate, boron phosphate and pumice.

6. The process of claim 1, wherein a gas mixture containing 0.1 to 10% by volume acrolein-cyanohydrin is used as the starting material.

References Cited

UNITED STATES PATENTS

| | | | |
|---|---|---|---|
| 3,050,546 | 8/1962 | Milberger | 260—465.3 |
| 3,164,626 | 1/1965 | Minekawa et al. | 23—151 |

FOREIGN PATENTS

| | | |
|---|---|---|
| 848,924 | 9/1960 | Great Britain. |

MILTON WEISSMAN, *Primary Examiner.*

OSCAR R. VERTIZ, *Examiner.*

H. S. MILLER, *Assistant Examiner.*